(12) United States Patent
Chen

(10) Patent No.: US 11,586,076 B2
(45) Date of Patent: Feb. 21, 2023

(54) LCD PANEL, MANUFACTURING METHOD THEREOF, AND LCD DEVICE

(71) Applicant: TCL CHINA STAR OPTOELECTRONICS TECHNOLOGY CO., LTD., Shenzhen (CN)

(72) Inventor: Xingwu Chen, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 432 days.

(21) Appl. No.: 16/756,473

(22) PCT Filed: Apr. 8, 2020

(86) PCT No.: PCT/CN2020/083787
§ 371 (c)(1),
(2) Date: Apr. 16, 2020

(87) PCT Pub. No.: WO2021/174638
PCT Pub. Date: Sep. 10, 2021

(65) Prior Publication Data
US 2022/0308404 A1 Sep. 29, 2022

(30) Foreign Application Priority Data
Mar. 4, 2020 (CN) .......................... 202010143301.5

(51) Int. Cl.
*G02F 1/1343* (2006.01)
*C09K 19/12* (2006.01)
(Continued)

(52) U.S. Cl.
CPC ........ *G02F 1/134309* (2013.01); *C09K 19/12* (2013.01); *C09K 19/2028* (2013.01);
(Continued)

(58) Field of Classification Search
CPC .... C09K 2019/3083; C09K 2019/3004; C09K 2019/301; C09K 2019/2078;
(Continued)

(56) References Cited

U.S. PATENT DOCUMENTS

2005/0024548 A1   2/2005 Choi et al.
2011/0234968 A1   9/2011 Arai et al.
(Continued)

FOREIGN PATENT DOCUMENTS

CN        1688920 A      10/2005
CN      102199431 A       9/2011
(Continued)

*Primary Examiner* — Mariam Qureshi
(74) *Attorney, Agent, or Firm* — PV IP PC; Wei Te Chung; Ude Lu

(57) ABSTRACT

The disclosure provides a liquid crystal display (LCD) panel, a manufacturing method thereof, and an LCD device. The LCD panel adopts a structure with multiple electrodes and dual-frequency liquid crystals. When a temperature of the LCD panel is low (below 0° C.), the LCD panel is driven at high frequency, so that it emits more heat. Therefore, a working temperature of the LCD panel is increased without adding a heating element. LCD devices using such LCD panels have wide working temperature ranges, and are well suited to be used outdoors.

19 Claims, 3 Drawing Sheets

(51) Int. Cl.
*C09K 19/20* (2006.01)
*C09K 19/30* (2006.01)
*G02F 1/1335* (2006.01)
*G02F 1/1337* (2006.01)

(52) U.S. Cl.
CPC ...... *C09K 19/3003* (2013.01); *C09K 19/3068* (2013.01); *G02F 1/133528* (2013.01); *G02F 1/133707* (2013.01); *C09K 2019/122* (2013.01); *C09K 2019/2042* (2013.01); *C09K 2019/2064* (2013.01); *C09K 2019/2078* (2013.01); *C09K 2019/301* (2013.01); *C09K 2019/3004* (2013.01); *C09K 2019/3083* (2013.01)

(58) Field of Classification Search
CPC .... C09K 2019/2064; C09K 2019/2042; C09K 2019/122; C09K 19/3068; C09K 19/3003; C09K 19/2028; C09K 19/12; G02F 1/133707; G02F 1/133528; G02F 1/1343
See application file for complete search history.

(56) References Cited

U.S. PATENT DOCUMENTS

| | | |
|---|---|---|
| 2013/0258222 A1 | 10/2013 | Kim |
| 2013/0335659 A1* | 12/2013 | Ma ........................ G02F 1/1333 438/30 |
| 2014/0285758 A1 | 9/2014 | Asakawa |
| 2014/0313461 A1 | 10/2014 | Kibe et al. |
| 2016/0046865 A1* | 2/2016 | Xie .................... C09K 19/3402 252/299.61 |
| 2016/0077385 A1* | 3/2016 | Cao .................. G02F 1/133512 445/25 |
| 2016/0187744 A1 | 6/2016 | Xie |
| 2017/0218686 A1* | 8/2017 | Galstian .............. G02F 1/13439 |
| 2019/0384123 A1 | 12/2019 | Wang |

FOREIGN PATENT DOCUMENTS

| | | |
|---|---|---|
| CN | 103364980 A | 10/2013 |
| CN | 104280952 A | 1/2015 |
| CN | 104503145 A | 4/2015 |
| CN | 107338057 A | 11/2017 |
| CN | 107632469 A | 1/2018 |

* cited by examiner

LCD PANEL, MANUFACTURING METHOD THEREOF, AND LCD DEVICE

FIELD

The present disclosure relates to the field of display technologies, and more particularly, relates to a liquid crystal display (LCD) panel, a manufacturing method thereof, and an LCD device adopting the LCD panel.

BACKGROUND

Currently, liquid crystal displays (LCDs), such as liquid crystal televisions, smartphones, computers, public display devices, and vehicle display devices, are the most widely used technology in the field of display. The LCD technologies have permeated into people's life. LCD devices have advantages of light and thin body, low power consumption, and ideal display effect. With rapid development of the LCD technologies, the LCD devices gradually transform from indoor displays to outdoor displays.

For outdoor LCD devices, a requirement of wide working temperature ranges must be satisfied. Normal LCD devices cannot be used outdoors because liquid crystal materials are active only within narrow temperature ranges. The liquid crystals even cannot work normally at low temperatures (below 0° C.). Traditionally, a heating element is disposed on the LCD devices to ensure the LCD devices can work normally outdoors. By the heating element, the LCD devices can work at an appropriate temperature even though an ambient temperature is below 0° C. However, the above method may extend boot time, increase costs, and result in inconvenient maintenance.

SUMMARY

The present disclosure provides an LCD panel, a manufacturing method thereof, and an LCD device. The LCD panel adopts a multi-electrode and dual-frequency liquid crystal design. The LCD panel is driven at high frequency when being used at a temperature below 0° C., so that the LCD panel emits more heat, thereby increasing a working temperature of the LCD panel without adding a heating element. LCD devices using such LCD panel have wide working temperature ranges and are well suited to be used outdoors.

In a first aspect, the present disclosure provides a liquid crystal display (LCD) panel, including: a first substrate, wherein the first substrate includes a first electrode layer and a second electrode layer, an insulating layer is disposed between the first electrode layer and the second electrode layer, and a first alignment layer is disposed on the second electrode layer; a second substrate, wherein the second substrate includes a third electrode layer, and a second alignment layer is disposed on the third electrode layer; a liquid crystal layer, wherein the liquid crystal layer is disposed between the first alignment layer and the second alignment layer, and a material of the liquid crystal layer includes a dual-frequency liquid crystal composition; a first polarization layer, wherein the first polarization layer is disposed on a surface of the first substrate away from the liquid crystal layer; and a second polarization layer, wherein the second polarization layer is disposed on a surface of the second substrate away from the liquid crystal layer.

In some embodiments, the second electrode layer includes at least two electrode units, and a slit is defined between the at least two electrode units.

In some embodiments, the first alignment layer is aligned in a direction tilted from the electrode units.

In some embodiments, an included angle of the direction of the first alignment layer and the electrodes units ranges from 90 degrees to 100 degrees.

In some embodiments, the dual-frequency liquid crystal composition includes 60% to 75% mass ratio of positive liquid crystals and 25% to 40% mass ratio of negative liquid crystals.

In some embodiments, the positive liquid crystals include a plurality of first compounds represented by following general formula:

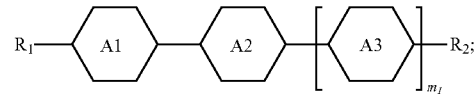

wherein $m_1$ is 0 or 1. $R_1$ and $R_2$ represent a group having a general formula of $C_nH_{2n+1}$, $OC_nH2_{n+1}$, $C_zH_{2z-1}$, or $OC_zH_{2z-1}$, H, F, or CN, wherein n denotes any integer from 0 to 9, and z denotes any integer from 1 to 9; and $A_1$, $A_2$, and $A_3$ are a polycyclic compound or a heterocyclic compound.

In some embodiments, the first compounds include one or more of

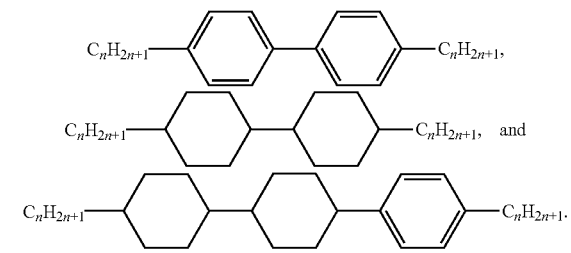

In some embodiments, the first compounds are

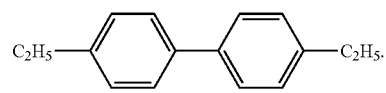

In some embodiments, the first compounds are

In some embodiments, the positive liquid crystals further include a plurality of second compounds having a general formula as follows:

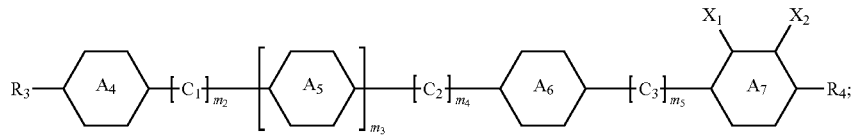

wherein $m_2$, m3, m4, and m5 are 0 or 1. R3 represents a group having a general formula of $C_nH_{2n+1}$, $OC_nH_{2n+1}$, $C_zH_{2z-1}$, or $OC_zH_{2z-1}$, wherein n denotes any integer from 0 to 9, and z denotes any integer from 1 to 9. R4 represents F, CN, or SCN. $A_4$, $A_5$, $A_6$, $A_7$ are a polycyclic compound or a heterocyclic compound. $X_1$ and $X_2$ represent H, F, CN, or SCN. $C_1$, $C_2$, and $C_3$ represent a group having a general formula of $C_xH_{2x}$, a COO group, a CH=CH group, a $CH_2$—O group, or a $CF_2$—O group, wherein x denotes any integer from 1 to 9, if at least two of $C_1$, $C_2$, or $C_3$ exist, at least one of the at least two of $C_1$, $C_2$, or $C_3$ represents a COO group, and if only one of $C_1$, $C_2$, or $C_3$ exists, the only one of $C_1$, $C_2$, and $C_3$ represents a COO group.

In some embodiments, the second compounds include one or more of

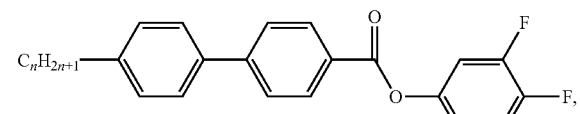

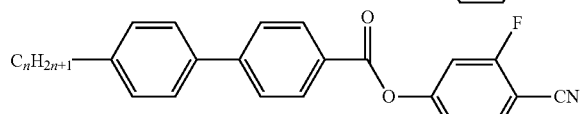

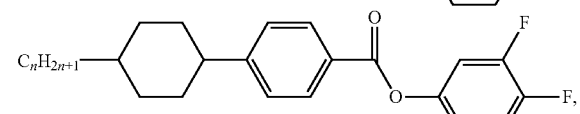

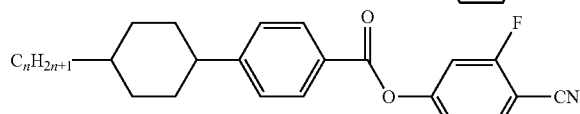

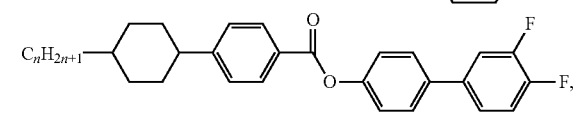

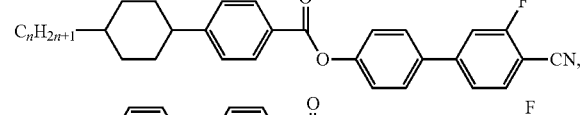

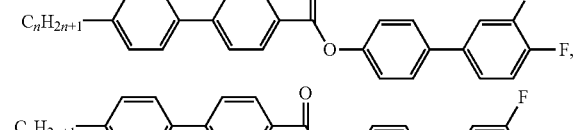

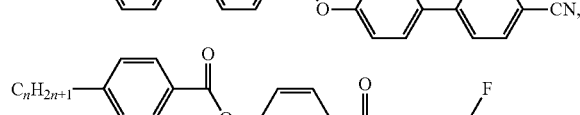

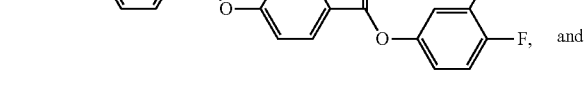
and

-continued

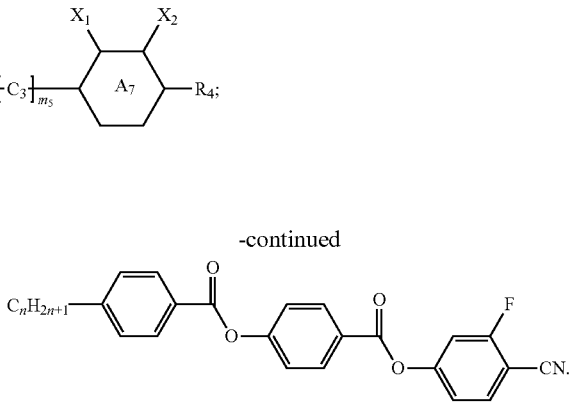

In some embodiments, the second compounds are

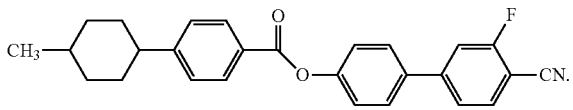 [SMILES: CC1CCC(c2ccc(C(=O)Oc3ccc(-c4ccc(C#N)c(F)c4)cc3)cc2)CC1]

In some embodiments, the second compounds are

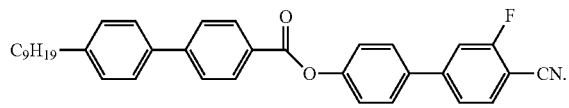

In some embodiments, the second compounds are

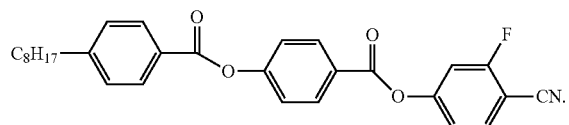

In some embodiments, the negative liquid crystals include a plurality of third compounds having a general formula as follows:

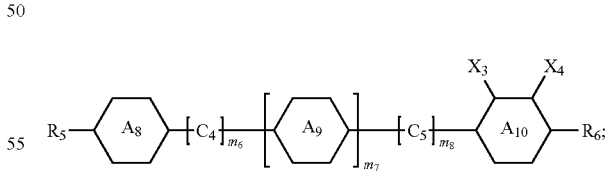

wherein $m_6$, $m_7$, and $m_8$ are 0 or 1. R5 and R6 represent a group having a general formula of $C_nH_{2n+1}$, $OC_nH_{2n+1}$, $C_zH_{2z-1}$, or $OC_zH_{2z-1}$, wherein n denotes any integer from 0 to 9, and z denotes any integer from 1 to 9. $A_8$, $A_9$, and $A_{10}$ are a polycyclic compound or a heterocyclic compound. $X_3$ and $X_4$ are H, F, or the group represented by $R_5$. $C_4$ and $C_5$ are a group having a general formula of $C_xH_{2x}$, a COO group, a CH=CH group, a $CH_2$—O group, or a $CF_2$—O group, wherein x denotes any integer from 1 to 9.

In some embodiments, the third compounds are

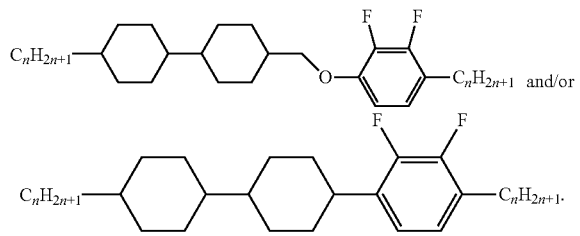

In some embodiments, the third compounds are

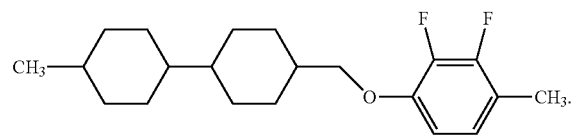 [SMILES: Cc1ccc(OCC2CCC(C3CCC(C)CC3)CC2)c(F)c1F]

In some embodiments, the third compounds are

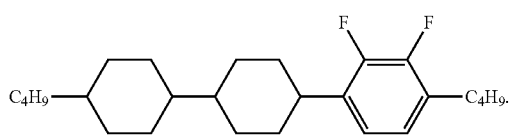

In a second aspect, an embodiment of the present disclosure provides a method of manufacturing a liquid crystal display (LCD) panel, including following steps: providing a first substrate, sequentially forming a first electrode layer, an insulating layer, and a second electrode layer on a surface of the first substrate, and forming a first alignment layer on the second electrode layer; providing a second substrate, forming a third electrode layer on a surface of the second substrate, and forming a second alignment layer on the third electrode layer; filling a dual-frequency liquid crystal composition between the first substrate and the second substrate to form a liquid crystal layer disposed between the first substrate and the second substrate; aligning the liquid crystal layer; and respectively forming a first polarization layer and a second polarization layer on a surface of the first substrate away from the liquid crystal layer and a surface of the second substrate away from the liquid crystal layer to form the LCD panel.

In a third aspect, an embodiment of the present disclosure provides a liquid crystal display (LCD) device, including any one of the above LCD panels. The LCD panels have wide working temperature ranges, can work normally at low temperatures (below 0° C.), and are well suited to be used outdoors.

Regarding the beneficial effects: in the present disclosure, an LCD panel is driven by three electrodes and adopts a dual-frequency liquid crystal technical solution, thereby expanding a working temperature range of the LCD panel. The LCD panel includes three electrodes. At low temperature (below 0° C.), the LCD panel is driven at high frequency by two electrodes, and a liquid crystal layer has a property of negative liquid crystals and is controlled by fringe field switching (FFS) technology to display. Because a display frequency is increased, the display panel emits more heat. Therefore, a working temperature of the display panel can be increased without adding a heating element. As a result, a manufacturing cost is tremendously reduced. At a temperature above 0° C., the LCD panel is driven at low frequency by three electrodes, and the liquid crystal layer has a property of positive liquid crystals and can be controlled by twisted nematic (TN) technology to display. LCD devices using such display panel not only can work normally at low temperatures (below 0° C.), thereby satisfying customs requirements, but also have advantages such as reduced manufacturing costs and convenient maintenance.

DETAILED DESCRIPTION

Figure 1:
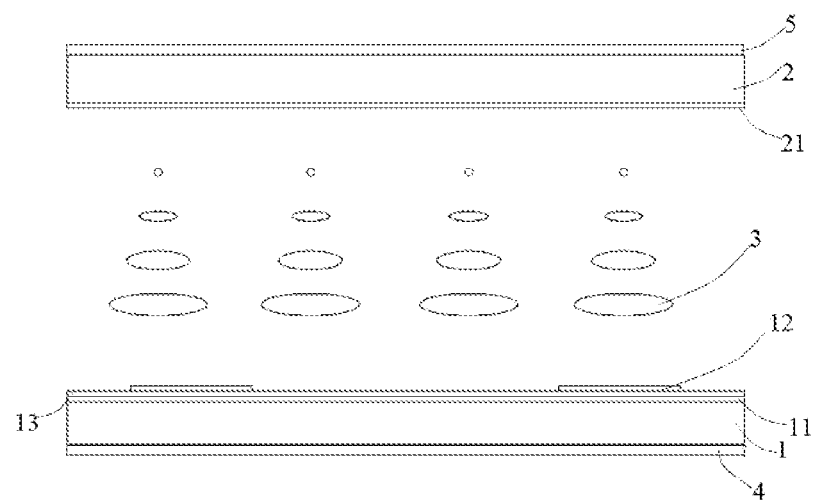
FIG. 1 is a schematic sectional view showing an LCD panel when no electric field is applied thereto according to an embodiment of the present disclosure.

The present disclosure provides an LCD panel, a manufacturing thereof, and an LCD device. Embodiments are further described below in detail with reference to accompanying drawings to make objectives, technical solutions, and effects of the present disclosure clearer and more precise.

Please refer to FIG. 1 to FIG. 4. In a first aspect, an embodiment of the present disclosure provides an LCD panel, including: a first substrate 1, wherein the first substrate 1 includes a first electrode layer 11 and a second electrode layer 12, an insulating layer 13 is disposed between the first electrode layer 11 and the second electrode layer 12, and a first alignment layer is disposed on the second electrode layer 12; a second substrate 2, wherein the second substrate 2 includes a third electrode layer 21, and a second alignment layer is disposed on the third electrode layer 21; a liquid crystal layer 3, wherein the liquid crystal layer 3 is disposed between the first alignment layer and the second alignment layer, and a material of the liquid crystal layer 3 includes a dual-frequency liquid crystal composition; a first polarization layer 4, wherein the first polarization layer 4 is disposed on a surface of the first substrate 1 away from the liquid crystal layer 3; and a second polarization layer 5, wherein the second polarization layer 5 is disposed on a surface of the second substrate 2 away from the liquid crystal layer 3.

The first substrate 1 and the second substrate 2 are disposed opposite to each other, the first substrate 1 is a thin film transistor (TFT) substrate, and the second substrate 2 is a color filter (CF) substrate. Liquid crystals near the first alignment layer are underside liquid crystals 6, liquid crystals near the second alignment layer are upper side liquid crystals 7, and an angle between an arrangement direction of the first alignment layer and an arrangement direction of the second alignment layer is 90 degrees. That is, a long axis of the upper side liquid crystals 7 is perpendicular to a long axis of the underside liquid crystals 6 when a voltage is not applied thereto, and the arrangement direction of the under liquid crystals 6 is oriented at 90 degrees with respect to the arrangement direction of the upper side liquid crystals 7.

The first polarization layer 4 is a first polarizer, the first polarizer layer 4 is attached to the surface of the first substrate 1 away from the liquid crystal layer 3. Similarly, the second polarization layer 5 is a second polarizer, the second polarizer layer 5 is attached to the surface of the second substrate 2 away from the liquid crystal layer 3. When a transmittance axis of the first polarizer is perpendicular to a transmittance axis of the second polarizer, the LCD panel is in a normal white mode. When the transmittance axis of the first polarizer is parallel to the transmittance axis of the second polarizer, the LCD is in a normal black mode.

Figure 2:
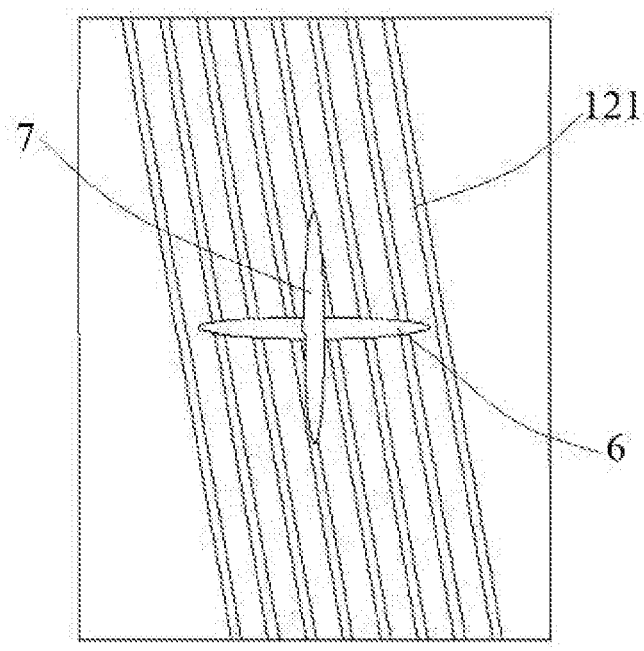
FIG. 2 is a top view showing the LCD panel when no electric field is applied thereto according to the embodiment of the present disclosure.

In some embodiments, the second electrode layer 12 is made of indium tin oxide (ITO) and includes at least two electrode units 121. A slit is defined between the at least two electrode units 121 which are parallel to each other. For example, as shown in FIG. 2, the second electrode layer includes eight strip-shaped electrode units 121, and a plurality of slits are defined between the strip-shaped electrode units 121 which are parallel to each other.

In some embodiments, the first alignment layer is aligned in a direction tiled from the electrode units. When a voltage is applied to liquid crystal molecules, an arrangement direction of the liquid crystal molecules is neither perpendicular nor parallel to an electric field line, thereby allowing the liquid crystal molecules to orient along an electric field. For instance, as shown in FIG. 2, an arrangement direction of the underside liquid crystals 6 is oriented at 90 degrees with respect to an arrangement direction of the upper side liquid crystals 6, and the first alignment layer is aligned in a direction tiled from the electrode units 121. In other words, when a voltage is not applied to the liquid crystal molecules, an angle between the long axis of the underside liquid crystals 6 and the electrode units 121 ranges from 90 degrees to 100 degrees.

The liquid crystal layer 3 includes a dual-frequency liquid crystal composition, which is a mixture of positive liquid crystals and negative liquid crystals. Driven by voltages with different frequencies, the dual-frequency liquid crystal composition may have both properties of the positive liquid crystals and negative liquid crystals. Dielectric constant of the dual-frequency liquid crystal composition may change along with a change in frequency of an electric field applied to the dual-frequency liquid crystal composition. The dielectric constant of the dual-frequency liquid crystal composition may change from a positive value to a negative value, resulting from retarded polarization of molecules due to rapid changes of an electric field. The phenomenon mainly happens in the positive liquid crystals under variable frequency electric fields. This is because the positive liquid crystals in the dual-frequency liquid crystal composition have a greater polarity and a longer conjugate structure, which are generally considered beneficial to the phenomenon. Therefore, the present embodiment adopts the positive liquid crystals with a specific structure and adjusts a mass ratio of the positive liquid crystals and the negative liquid crystals, so that the dielectric constant of the dual-frequency liquid crystal composition may significantly change along with a change in frequency of an electric field applied to the dual-frequency liquid crystal composition which can be used in the LCD panel of the present embodiment.

In some embodiments, the dual-frequency liquid crystal composition includes 60% to 75% mass ratio of the positive liquid crystals and 25% to 40% mass ratio of the negative liquid crystals.

In some embodiments, the positive liquid crystals include a plurality of first compounds represented by a general formula as follows:

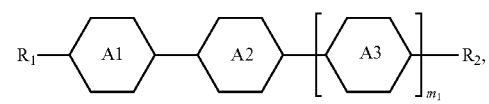

wherein $m_1$ is 0 or 1; $R_1$ and $R_2$ represent a group having a general formula of $C_nH_{2n+1}$, $OC_nH2_{n+1}$, $C_zH_{2z-1}$, or $OC_zH_{2z-1}$, H, F, or CN, wherein n denotes any integer from 0 to 9, and z denotes any integer from 1 to 9; and $A_1$, $A_2$, and $A_3$ are a polycyclic compound or a heterocyclic compound. For example, $A_1$, $A_2$, and $A_3$ may be a benzene ring, cyclohexane, or a five-membered ring.

In some embodiments, the first compounds include one or more of

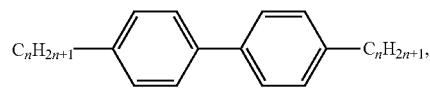

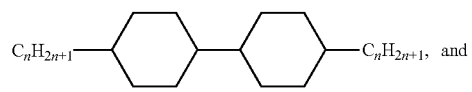 and

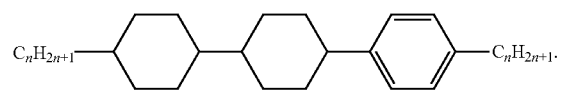

For example, the first compounds are

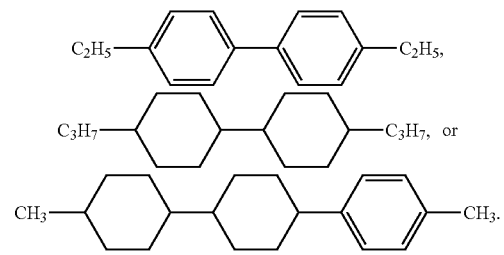

In some embodiment, the positive liquid crystals further include a plurality of second compounds represented by a general formula as follows:

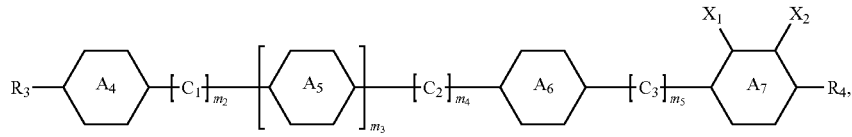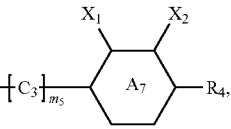

wherein $m_2$, $m3$, $m4$, and $m5$ are 0 or 1; R3 represents a group having a general formula of $C_nH_{2n+1}$, $OC_nH_{2n+1}$, $C_zH_{2z-1}$, or $OC_zH_{2z-1}$, wherein n denotes any integer from 0 to 9, and z denotes any integer from 1 to 9; R4 represents F, CN, or SCN; $A_4$, $A_5$, $A_6$, $A_7$ are a polycyclic compound or a heterocyclic compound; $X_1$ and $X_2$ represent H, F, CN, or SCN; and $C_1$, $C_2$, and $C_3$ represent a group having a general formula of $C_xH_{2x}$, a COO group, a CH=CH group, a $CH_2$—O group, or a $CF_2$—O group, wherein x denotes any integer from 1 to 9, if at least two of $C_1$, $C_2$, or $C_3$ exist, at least one of the at least two of $C_1$, $C_2$, or $C_3$ represents a COO group, and if only one of $C_1$, $C_2$, or $C_3$ exists, the only one of $C_1$, $C_2$, and $C_3$ represents a COO group.

Adding the second compounds into the positive liquid crystals not only improves rigidity of the liquid crystal molecules (because a conjugate structure thereof is lengthened), but also provides F, CN, SCN with high electronegativity as an end-group, thereby further lengthening the conjugate structure.

In some embodiments, the second compounds include one or more of

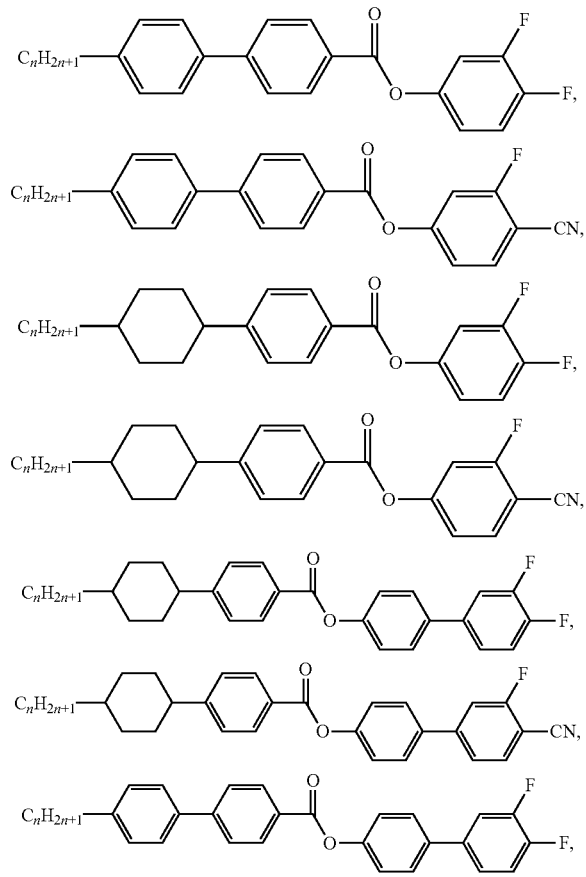

-continued

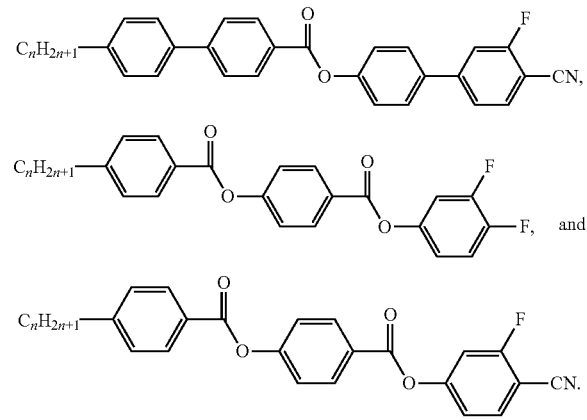

For example, the second compounds are

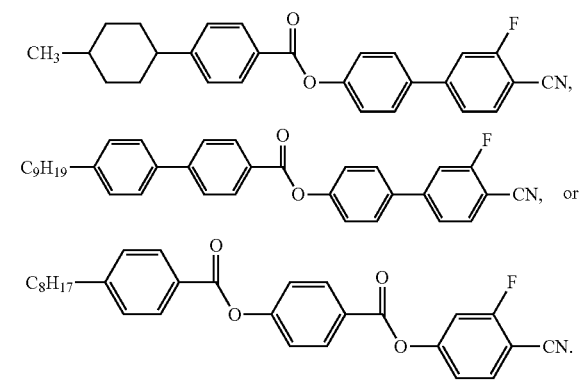

The negative liquid crystals include a plurality of third compounds represented by a general formula as follows:

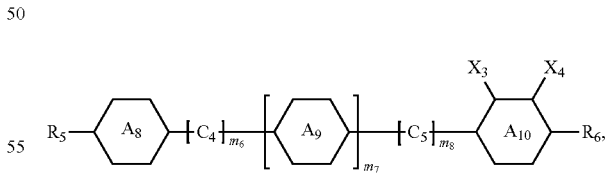

wherein $m_6$, $m_7$, and $m_8$ are 0 or 1; R5 and R6 represent a group having a general formula of $C_nH_{2n+1}$, $OC_nH_{2n+1}$, $C_zH_{2z-1}$, or $OC_zH_{2z-1}$, wherein n denotes any integer from 0 to 9, and z denotes any integer from 1 to 9; $A_8$, $A_9$, and $A_{10}$ are a polycyclic compound or a heterocyclic compound; $X_3$ and $X_4$ are H, F, or the group represented by $R_5$; and $C_4$ and $C_5$ are a group having a general formula of $C_xH_{2x}$, a COO group, a CH=CH group, a $CH_2$—O group, or a $CF_2$—O group, wherein x denotes any integer from 1 to 9.

In some embodiments, the third compounds are

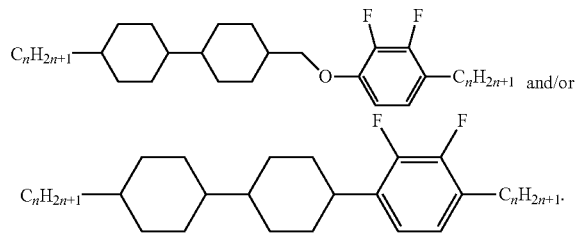 and/or

For example, the third compounds are

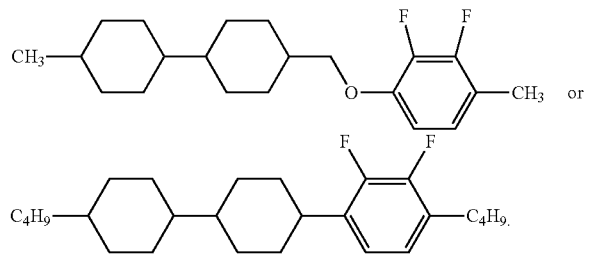 or

In some embodiment, the dual-frequency liquid crystal composition includes 30% to 50% mass ratio of the first compounds, 20% to 30% mass ratio of the second compounds, and 25% to 40% of the third compounds.

For example, the dual-frequency liquid crystal composition includes 50% mass ratio of the first compounds, 20% mass ratio of the second compounds, and 30% mass ratio of the third compounds, wherein the first compounds are

the second compounds are

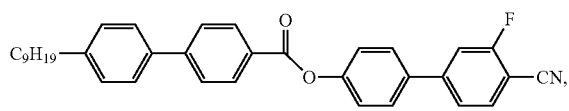

and the third compounds are

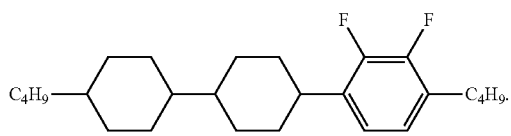

A working principle of the LCD panel provided by the present embodiment is described as follows.

When a working temperature is below 0° C., a high frequency electric field is applied between the first electrode 11 and the second electrode 12. The liquid crystal layer 3 has a property of negative liquid crystals and is controlled by fringe field switching (FFS) technology to display. Because a display frequency is increased, the display panel emits more heat. Therefore, a working temperature of the display panel can be increased without adding a heating element.

When a working temperature is above 0° C., the display panel is driven at low frequency. Voltages applied to the first electrode 11 and the second electrode 12 are same, but are different from a voltage applied to the third electrode 21, thereby forming a potential difference. The liquid crystal layer 3 has a property of positive liquid crystals and is controlled by twisted nematic (TN) technology to display.

For example, in the LCD panel, a transmittance axis of the first polarization layer 4 is perpendicular to a transmittance axis of the second polarization layer 5. An arrangement direction of the underside liquid crystals 6 is oriented at 90 degrees with respect to an arrangement direction of the upper side liquid crystals 7 when a voltage is not applied thereto. Therefore, when a voltage is not applied to the liquid crystal layer 3, only unidirectional polarized light remains after incident light passes through the first polarization layer 4. Since the arrangement direction of the upper side liquid crystals 7 is oriented at 90 degrees with respect to the arrangement direction of the underside liquid crystals 6, when light reaches the second polarization layer 5, a direction of polarized light is just rotated at 90 degrees, and an angle between a direction of the first polarization and a direction of the second polarization is 90 degrees as well. Therefore, light can pass through the second polarization layer 5, and the LCD panel is in a bright state.

Figure 4:
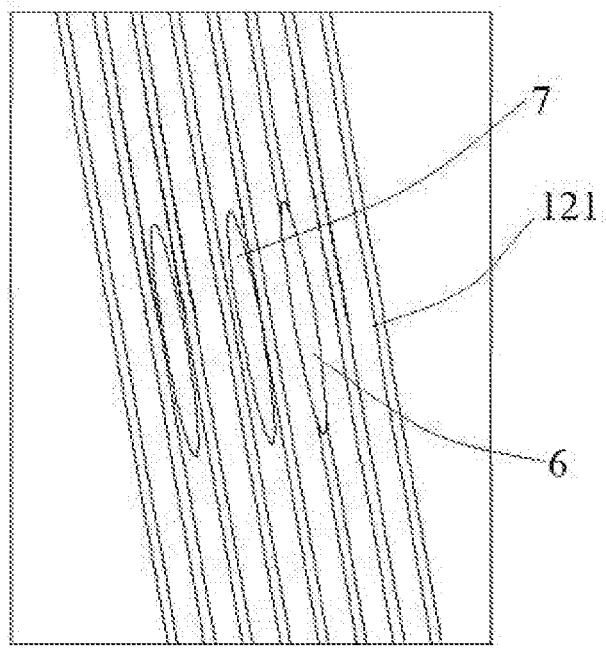
FIG. 4 is a top view showing the LCD panel when it is driven at high frequency according to the embodiment of the present disclosure.

When a working temperature of the LCD panel is below 0° C., a high frequency electric field is applied between the first electrode 11 and second electrode 12, and the liquid crystal layer 3 has a property of negative liquid crystals. As shown in FIG. 4, the liquid crystal layer 3 is controlled by FFS technology to display when a voltage is applied thereto, and the liquid crystal molecules of the liquid crystal layer 3 are parallel to the second electrode 12. That is, a long axis of the liquid crystal molecules is parallel to the second electrode 12. Because there are no effective optical path differences, light cannot pass through the second polarization layer 5, and the LCD panel is in a dark state. Because the LCD panel is driven at high frequency, a display frequency is increased. Therefore, the display panel emits more heat, and a working temperature of the display panel is increased without adding a heating element.

Figure 3:
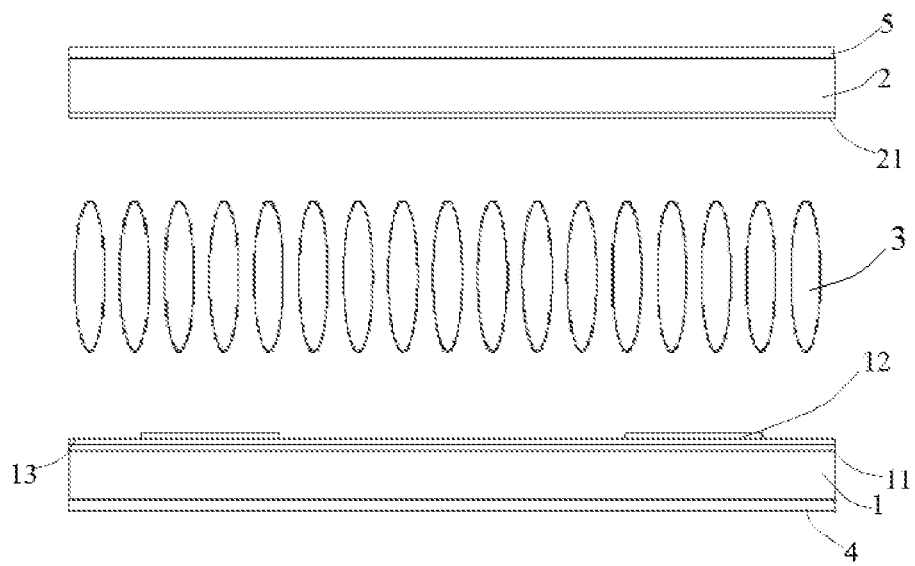
FIG. 3 is a schematic sectional view showing the LCD panel when it is driven at low frequency according to the embodiment of the present disclosure.

When a working temperature of the LCD panel is above 0° C., voltages applied to the first electrode 11 and the second electrode 12 are same, but are different from a voltage applied to the third electrode 21, thereby forming a potential difference. In addition, the LCD panel is driven at low frequency ranging from 30 Hz to 300 Hz (60 Hz is preferred), and the liquid crystal layer 3 has a property of positive liquid crystals. As shown in FIG. 3, the liquid crystal molecules of the liquid crystal layer 3 are in an erected state between the second electrode 12 and the third electrode 21 when a voltage is applied to the liquid crystal layer 3. That is, the long axis of the liquid crystal molecules is parallel to an electric field line. As a result, extending path of unidirectional polarized light passing through the second polarization layer 5 will not be changed when passing through the liquid crystal molecules. Therefore, light cannot pass through the first polarization layer 4, and the display panel is in a dark state.

Figure 5:
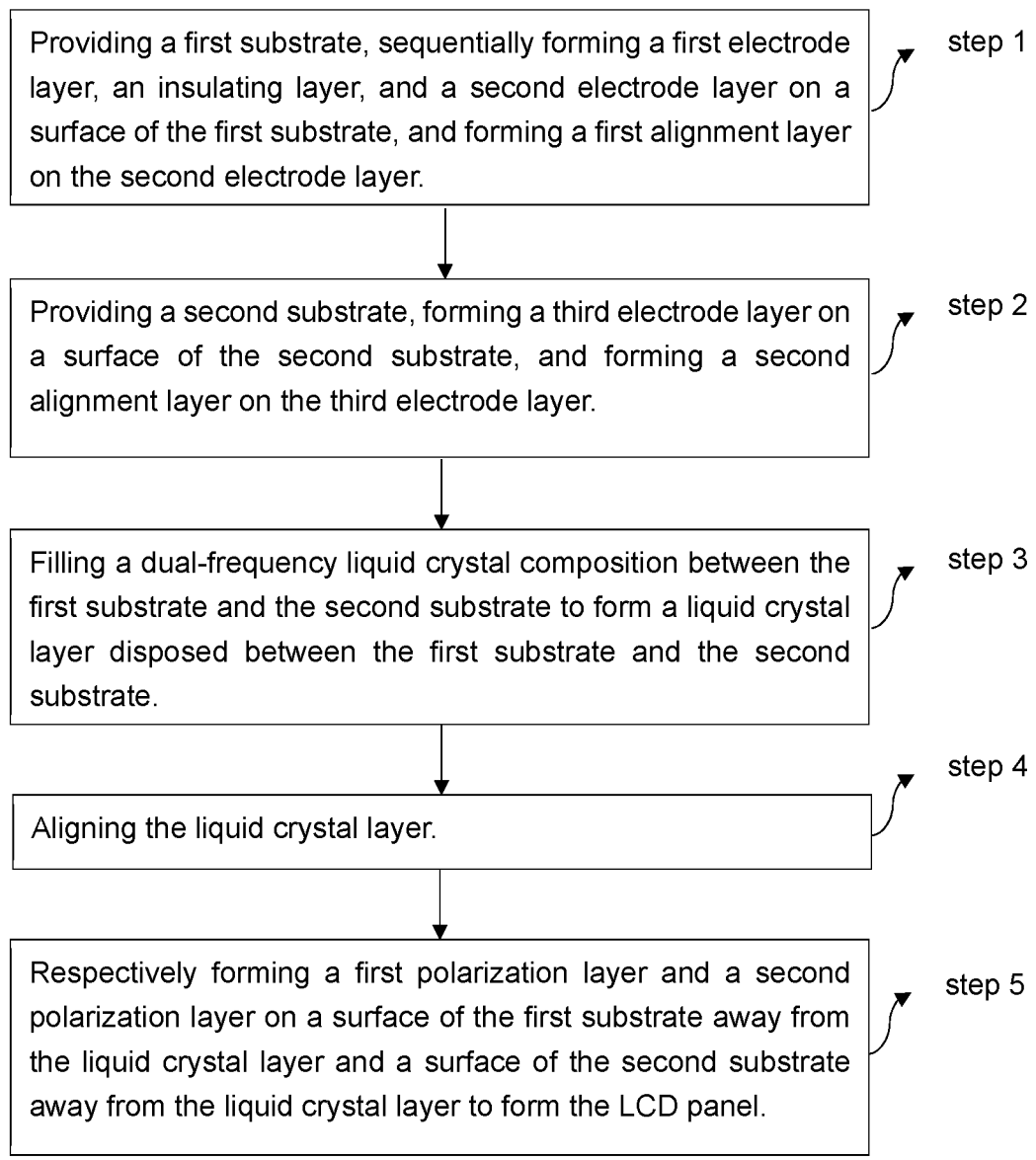
FIG. 5 is a schematic flowchart showing a method of manufacturing an LCD panel according to an embodiment of the present disclosure.

In a second aspect, an embodiment of the present disclosure provides a method of manufacturing the display panel disclosed in the first aspect, as shown in FIG. 5, including following steps:

Step 1: providing a first substrate, sequentially forming a first electrode layer, an insulating layer, and a second electrode layer on a surface of the first substrate, and forming a first alignment layer on the second electrode layer.

Step 2: providing a second substrate, forming a third electrode layer on a surface of the second substrate, and forming a second alignment layer on the third electrode layer.

Step 3: filling a dual-frequency liquid crystal composition between the first substrate and the second substrate to form a liquid crystal layer disposed between the first substrate and the second substrate.

Step 4: aligning the liquid crystal layer.

Step 5: respectively forming a first polarization layer and a second polarization layer on a surface of the first substrate away from the liquid crystal layer and a surface of the second substrate away from the liquid crystal layer to form the LCD panel.

It should be noted that the liquid crystal layer in the step 3 may be formed by conventional methods in the art, which is not described here. The first polarization layer and the second polarization layer in the step 5 may be formed by conventional methods in the art, which is not described here.

In the step 4, the liquid crystal layer may be aligned by frictional rubbing or light.

Specifically, the first alignment layer and the second alignment layer may be aligned by frictional rubbing: first respectively rubbing the first alignment layer and the second alignment layer with a cloth roller to form a plurality of tunnels thereon, and then washing surfaces of the first alignment layer and the second alignment layer with deionized water. The liquid crystal molecules of the liquid crystal layer are aligned along the tunnels on the first alignment layer and the second alignment layer.

Specifically, the first alignment layer and the second alignment layer may be aligned by light: reactive monomers in the liquid crystal layer are polymerized after being irradiated with ultraviolet (UV) light, thereby curing surfaces of the first alignment layer and the second alignment layer. During a UV light irradiating process, an electrical power supply is always applied to the above two alignment layers. The reactive monomers are moved to the surfaces of the first alignment layer and the second alignment layer along a direction of a predetermined tilt angle under an electric field and anchoring forces of the first alignment layer and the second alignment layer. After that, the surfaces of the first alignment layer and the second alignment layer are curved, and an alignment process is finished.

In a third aspect, an embodiment of the present disclosure provides an LCD device, including a backlight module and an LCD panel. The backlight module is configured to provide a light source for the LCD panel. The LCD panel described in the present embodiment is the LCD panel disclosed by the first aspect, and is not illustrated again here.

The backlight module may be products disclosed by conventional technologies. For example, the backlight module may include a light source, a light guide plate, a reflection plate, a diffusion plate, and a prism sheet, which are stacked on one another. Light emitted from the light source spreads everywhere by the light guide plate. Then, all of light is concentrated onto the liquid crystal molecules by the reflection plate. Finally, light is evenly emitted through the prism sheet and the diffusion plate, thereby preventing a middle portion of the LCD panel from being overly bright. and preventing a portion of the LCD panel surrounding the middle portion from being overly dark.

It should be noted that many changes and modifications to the described embodiment can be carried out by those skilled in the art, and all such changes and modifications are intended to be included within the scope of the appended claims.

What is claimed is:

1. A liquid crystal display (LCD) panel, comprising:
a first substrate, wherein the first substrate comprises a first electrode layer and a second electrode layer, an insulating layer is disposed between the first electrode layer and the second electrode layer, and a first alignment layer is disposed on the second electrode layer;
a second substrate, wherein the second substrate comprises a third electrode layer, and a second alignment layer is disposed on the third electrode layer;
a liquid crystal layer, wherein the liquid crystal layer is disposed between the first alignment layer and the second alignment layer, and a material of the liquid crystal layer comprises a dual-frequency liquid crystal composition, the dual-frequency liquid crystal composition comprises positive liquid crystals and negative liquid crystals, the positive liquid crystals comprise a plurality of first compounds represented by a general formula as follows:

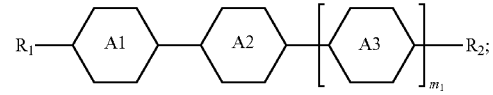

wherein m1 is 0 or 1;
R1 and R2 represent a group having a general formula of CnH2n+1, OCnH2n+1, CzH2z−1, or OCzH2z−1, H, F, or CN, wherein n denotes any integer from 0 to 9, and z denotes any integer from 1 to 9; and
A1, A2, and A3 are a polycyclic compound or a heterocyclic compound;
a first polarization layer, wherein the first polarization layer is disposed on a surface of the first substrate away from the liquid crystal layer; and
a second polarization layer, wherein the second polarization layer is disposed on a surface of the second substrate away from the liquid crystal layer.

2. The LCD panel of claim 1, wherein the second electrode layer comprises at least two electrode units, and a slit is defined between the at least two electrode units.

3. The LCD panel of claim 2, wherein the first alignment layer is aligned in a direction tilted from the electrode units.

4. The LCD panel of claim 3, wherein an included angle between the direction of the first alignment layer and the electrode units ranges from 90 degrees to 100 degrees.

5. The LCD panel of claim 1, wherein the dual-frequency liquid crystal composition comprises 60% to 75% mass ratio of the positive liquid crystals and 25% to 40% mass ratio of the negative liquid crystals.

6. The LCD panel of claim 5, wherein the negative liquid crystals comprise a plurality of third compounds having a general formula as follows:

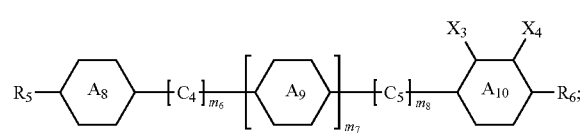

wherein m6, m7, and m8 are 0 or 1;

R5 and R6 represent a group having a general formula of CnH2n+1, OCnH2n+1, CzH2z-1, or OCzH2z-1, wherein n denotes any integer from 0 to 9, and z denotes any integer from 1 to 9;

A8, A9, and A10 are a polycyclic compound or a heterocyclic compound;

X3 and X4 are H, F, or the group represented by R5; and

C4 and C5 are a group having a general formula of CxH2x, a COO group, a CH=CH group, a CH2—O group, or a CF2—O group, wherein x denotes any integer from 1 to 9.

7. The LCD panel of claim 6, wherein the third compounds are

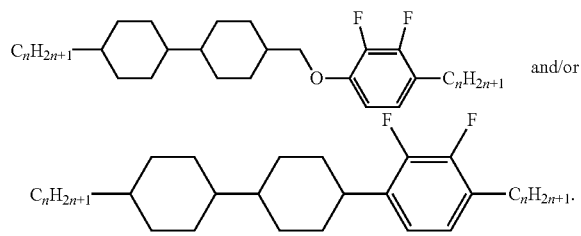

and/or

8. The LCD panel of claim 7, wherein the third compounds are

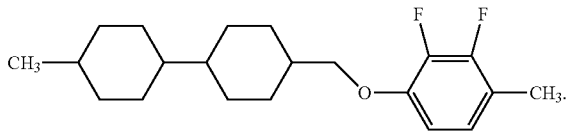

9. The LCD panel of claim 7, wherein the third compounds are

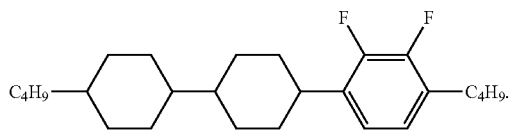

10. The LCD panel of claim 1, wherein the first compounds comprise one or more of

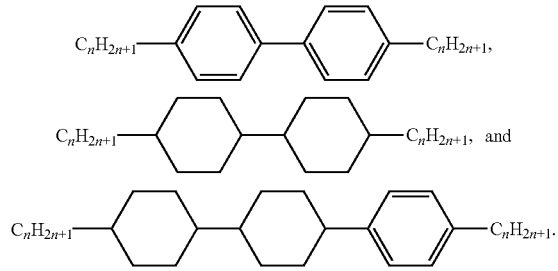

11. The LCD panel of claim 10, wherein the first compounds are

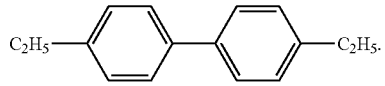

12. The LCD panel of claim 10, wherein the first compounds are

13. The LCD panel of claim 1, wherein the positive liquid crystals further comprise a plurality of second compounds having a general formula as follows:

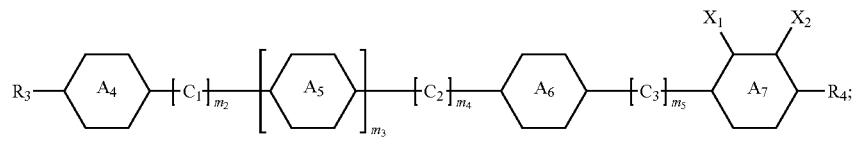

wherein m2, m3, m4, and m5 are 0 or 1;

R3 represents a group having a general formula of CnH2n+1, OCnH2n+1, CzH2z-1, or OCzH2z-1, wherein n denotes any integer from 0 to 9, and z denotes any integer from 1 to 9;

R4 represents F, CN, or SCN;

A4, A5, A6, A7 are a polycyclic compound or a heterocyclic compound;

X1 and X2 represent H, F, CN, or SCN; and

C1, C2, and C3 represent a group having a general formula of CxH2x, a COO group, a CH=CH group, a CH2—O group, or a CF2—O group, wherein x denotes any integer from 1 to 9, if at least two of C1, C2, or C3 exist, at least one of the at least two of C1, C2, or C3 represents a COO group, and if only one of C1, C2, or C3 exists, the only one of C1, C2, and C3 represents a COO group.

14. The LCD panel of claim 13, wherein the second compounds comprise one or more of

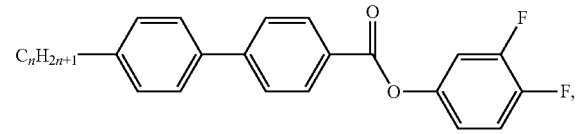

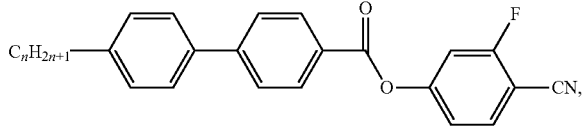

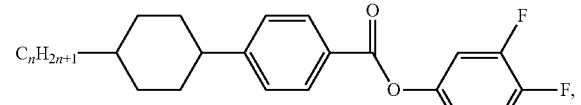

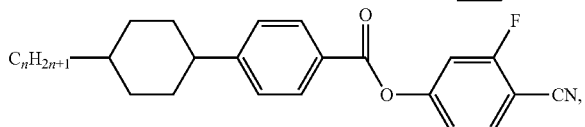

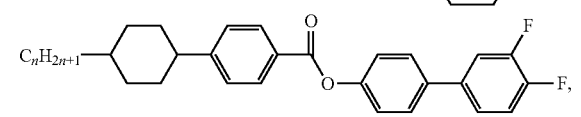

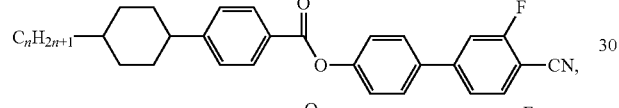

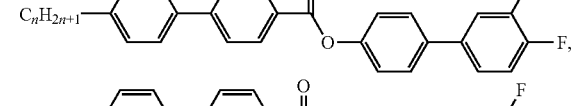

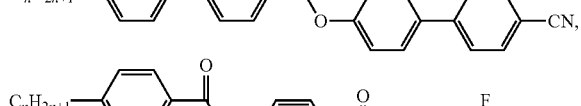

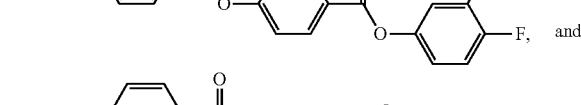

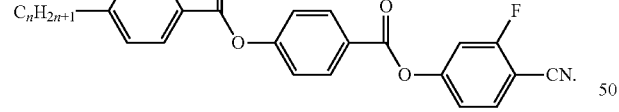

15. The LCD panel of claim 14, wherein the second compounds are

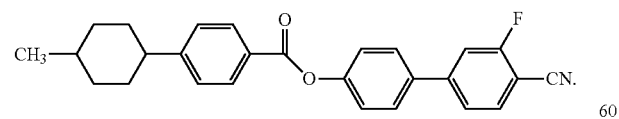

16. The LCD panel of claim 14, wherein the second compounds are

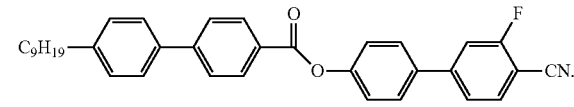

17. The LCD panel of claim 14, wherein the second compounds are

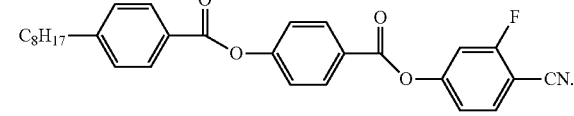

18. A liquid crystal display (LCD) device, comprising the LCD panel of claim 1.

19. A method of manufacturing a liquid crystal display (LCD) panel, comprising following steps:
providing a first substrate, sequentially forming a first electrode layer, an insulating layer, and a second electrode layer on a surface of the first substrate, and forming a first alignment layer on the second electrode layer;
providing a second substrate, forming a third electrode layer on a surface of the second substrate, and forming a second alignment layer on the third electrode layer;
filling a dual-frequency liquid crystal composition between the first substrate and the second substrate to form a liquid crystal layer disposed between the first substrate and the second substrate, the dual-frequency liquid crystal composition comprises positive liquid crystals and negative liquid crystals, the positive liquid crystals comprise a plurality of first compounds represented by a general formula as follows:

wherein m1 is 0 or 1;
R1 and R2 represent a group having a general formula of CnH2n+1, OCnH2n+1, CzH2z−1, or OCzH2z−1, H, F, or CN, wherein n denotes any integer from 0 to 9, and z denotes any integer from 1 to 9; and
A1, A2, and A3 are a polycyclic compound or a heterocyclic compound;
aligning the liquid crystal layer; and
respectively forming a first polarization layer and a second polarization layer on a surface of the first substrate away from the liquid crystal layer and a surface of the second substrate away from the liquid crystal layer to form the LCD panel.

* * * * *